US010851864B2

(12) United States Patent
Pielock

(10) Patent No.: US 10,851,864 B2
(45) Date of Patent: Dec. 1, 2020

(54) AIR SPRING UNIT HAVING A DIVIDED OUTER GUIDE

(71) Applicant: Continental Teves AG & Co. oHG, Frankfurt am Main (DE)

(72) Inventor: Ralf Pielock, Essel (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/324,310

(22) PCT Filed: Aug. 30, 2017

(86) PCT No.: PCT/EP2017/071758
§ 371 (c)(1),
(2) Date: Feb. 8, 2019

(87) PCT Pub. No.: WO2018/046367
PCT Pub. Date: Mar. 15, 2018

(65) Prior Publication Data
US 2019/0186580 A1    Jun. 20, 2019

(30) Foreign Application Priority Data

Sep. 6, 2016  (DE) .......................... 10 2016 216 910

(51) Int. Cl.
*F16F 9/05*    (2006.01)
*F16F 9/38*    (2006.01)
(Continued)

(52) U.S. Cl.
CPC ................ *F16F 9/05* (2013.01); *B60G 11/27* (2013.01); *B60G 15/12* (2013.01); *F16F 9/0409* (2013.01);
(Continued)

(58) Field of Classification Search
CPC .. F16F 9/05; F16F 9/055; F16F 9/0409; F16F 2230/0023; F16F 2230/0052;
(Continued)

(56) References Cited

U.S. PATENT DOCUMENTS 2,960,333 A * 11/1960 McGavern, Jr. ...... F16F 9/0445
267/64.24
3,438,309 A *  4/1969 Boileau ................ F16F 9/0409
92/103 R
(Continued)

FOREIGN PATENT DOCUMENTS

CN      101654054 A    2/2010
DE      29823508 U1    9/1999
(Continued)

OTHER PUBLICATIONS

EPO machine translation, DE 10 2006 004459. (Year: 2007).*
(Continued)

*Primary Examiner* — Thomas J Williams
(74) *Attorney, Agent, or Firm* — RatnerPrestia

(57) ABSTRACT

An air spring unit for a chassis of a motor vehicle, includes an air spring cover and an air spring piston, wherein an airtightly secured rolling bellows made of elastomer material partially delimits a working chamber between the air spring cover and the air spring piston, which working chamber can be filled with compressed air, wherein the rolling bellows is surrounded by a divided, sleeve-shaped outer guide having a first outer guide part and a second outer guide part.

12 Claims, 3 Drawing Sheets

(51) Int. Cl.
*B60G 11/27* (2006.01)
*B60G 15/12* (2006.01)
*F16F 9/04* (2006.01)
*F16F 13/00* (2006.01)

(52) U.S. Cl.
CPC .............. *F16F 9/0472* (2013.01); *F16F 9/38* (2013.01); *F16F 13/002* (2013.01); *B60G 2202/152* (2013.01); *B60G 2202/32* (2013.01); *B60G 2206/42* (2013.01); *F16F 2222/126* (2013.01); *F16F 2230/0023* (2013.01); *F16F 2230/0052* (2013.01)

(58) Field of Classification Search
CPC ........... F16F 2230/0058; F16F 2230/10; F16F 2230/105; B60G 11/27
USPC ................. 267/64.23, 64.24, 64.27, 122
See application file for complete search history.

(56) References Cited

U.S. PATENT DOCUMENTS

| | | | | |
|---|---|---|---|---|
| 3,627,298 | A | * | 12/1971 | Gaydecki ................. F16F 9/05 267/118 |
| 5,460,354 | A | * | 10/1995 | Easter .................... B60G 15/12 188/322.12 |
| 6,336,610 | B1 | | 1/2002 | Wode |
| 6,536,749 | B1 | * | 3/2003 | Luhmann ............... B60G 15/12 267/220 |
| 6,637,733 | B1 | * | 10/2003 | Weitzenhof ........... F16F 9/0454 267/64.21 |
| 8,376,327 | B2 | | 2/2013 | Lee et al. |
| 9,399,379 | B2 | | 7/2016 | Gleu et al. |
| 9,512,895 | B2 | | 12/2016 | Behmenburg et al. |
| 2002/0130452 | A1 | | 9/2002 | Behmenburg et al. |
| 2016/0107496 | A1 | | 4/2016 | Pielock |

FOREIGN PATENT DOCUMENTS

| | | | |
|---|---|---|---|
| DE | 19834092 | A1 | 2/2000 |
| DE | 10106065 | A1 | 9/2001 |
| DE | 20022663 | U1 | 2/2002 |
| DE | 10111242 | C1 | 8/2002 |
| DE | 102006005459 | A1 | 8/2007 |
| DE | 102007004035 | A1 | 7/2008 |
| DE | 102009003476 | A1 | 8/2010 |
| DE | 102010038238 | A1 | 4/2012 |
| DE | 102012201104 | A1 | 4/2013 |
| DE | 102011119206 | A1 | 5/2013 |
| DE | 102013203887 | A1 | 11/2013 |
| DE | 102013211666 | A1 | 12/2014 |
| DE | 102015007127 | A1 | 3/2016 |
| JP | 2010091031 | A | 4/2010 |
| JP | 2010255646 | A | 11/2010 |
| JP | 2011080550 | A | 4/2011 |
| WO | WO-2008037319 | A1 * | 4/2008 ................ F16F 9/05 |

OTHER PUBLICATIONS

German Search Report for German Application No. 10 2016 216 910.6, with partial translation, dated Aug. 24, 2017—9 pages.
International Search Report and Written Opinion for Application No. PCT/EP2017/071758, dated Dec. 7, 2017—8 pages.

* cited by examiner

AIR SPRING UNIT HAVING A DIVIDED OUTER GUIDE

CROSS REFERENCE TO RELATED APPLICATIONS

This application is the U.S. National Phase Application of PCT International Application No. PCT/EP2017/071758, filed Aug. 30, 2017, which claims priority to German Patent Application No. 10 2016 216 910.6, filed Sep. 6, 2016, the contents of such applications being incorporated by reference herein.

FIELD OF THE INVENTION

The invention relates to an air spring unit.

BACKGROUND OF THE INVENTION

An air spring unit of the kind known, for example, from DE 198 34 092 A1, incorporated herein by reference, is arranged between the motor vehicle chassis or a wheel carrier and the motor vehicle body. In general, the air spring unit comprises an air spring and a shock damper. Here, the air spring performs the function of cushioning the wheel, while the shock damper damps the oscillations of the wheel and of the motor vehicle body.

The air spring substantially comprises an air spring cover, an air spring piston and rolling bellows clamped between them, by which a working chamber under air pressure is partially delimited. By way of the air spring cover, the air spring unit is connected to the motor vehicle body by means of appropriate fastening means.

In order to make possible driving comfort which is as pleasant as possible, the air spring characteristic of the air spring must be appropriately tuned. For this purpose, use is made of rolling bellows with walls which are as thin as possible since such bellows ensure a high level of rolling comfort. In order nevertheless to achieve an adequate loadbearing capacity of the overall system with these rolling bellows, the rolling bellows or the air spring is provided with an outer guide, which surrounds the rolling bellows as a supporting corset in the form of a sleeve. In this way, it is possible, for example, to optimize a thin rolling bellows having a thin light metal sleeve for high internal pressures and hence for a high loadbearing capacity while simultaneously obtaining advantageous harshness behavior. In this case, the outer guide is designed and arranged in such a way that, during inward deflection, the rolling bellows rolls on the outside of the concentric rolling piston, on the one hand, and on the inner surface of the outer guide, on the other hand.

The shock damper arranged within the air spring is, on the one hand, connected to the wheel carrier and, on the other hand, is secured or mounted by its damper rod in the air spring bellows using a damper bearing, thereby ensuring that the forces or oscillations emanating from the wheel are damped into the body. During inward deflection of the vehicle wheel toward the vehicle body, there are pivoting movements of the air spring together with the outer guide relative to the rolling piston. The lower rolling fold of the air spring is thereby pressed against the rolling piston, as a result of which a radial force is transmitted to the damper tube or the shock damper. During cornering too, direct transverse forces act on the shock damper, and it is best if these are absorbed by the damper bearing. Thus, the shock damper is acted upon by unwanted forces, which lead to increased friction between the damper rod and the damper tube, as a result of which there is increased wear and more rapid failure of the shock damper. In order to subject the shock damper to lower loading, it is important as far as possible to avoid transmitting the pivoting movements of the air spring to the rolling piston and to reduce the transverse forces.

In order to reduce the pivoting movements of the air spring, it is possible to provide a cardanic bearing in the form of a further rolling fold on the air spring cover, as is known from DE 101 11 242 C1, incorporated herein by reference. In this case, the upper rolling fold/cardanic fold rests by its axial end against the underside of the air spring cover, at least over part of the spring travel of the air spring. The cardanic bearing thereby created enables the air spring to pivot relative to the shock damper, wherein the rolling fold poses only a slight resistance thereto.

During driving, the rolling bellows is also subject to a torsional movement owing to the kinematic axial movements between the air spring cover and the air spring piston. In this case, there is a risk that the rolling bellows, which is generally reinforced by reinforcements, will be damaged. For this reason, the air spring in DE 10 2012 201 104 A1, incorporated herein by reference, has a fold system which is provided underneath the air spring cover, for example. This fold system serves to compensate torsion and also additionally acts as a cardanic fold. This is assisted by a hybrid bellows, which is reinforced by means of reinforcements to give a cross ply bellows, on the one hand, and an axial bellows, on the other hand. In the region of rolling contact on the air spring piston, the fabric reinforcements extend crosswise, thereby ensuring a robust rolling bellows section. To reduce torsional stiffness, the fabric reinforcements are aligned parallel to the longitudinal axis of the air spring unit in the region of the fold system. The pliable rolling bellows section can thereby compensate the torsional movements.

However, the disadvantage is that the air spring together with the outer guide pivots relative to the rolling piston during inward deflection and, as a result, the lower rolling fold is pressed against the rolling piston, as before. The cardanic fold in the region of the air spring cover can reduce this only to a slight extent.

SUMMARY OF THE INVENTION

The problem addressed by an aspect of the invention is that of providing an air spring unit that has improved transverse stiffness and effective absorption of torsion.

According to an aspect of the invention, an air spring unit for a chassis of a motor vehicle is provided, said air spring unit comprising an air spring cover and an air spring piston, wherein an airtightly secured rolling bellows made of elastomer material partially delimits a working chamber between the air spring cover and the air spring piston, which working chamber can be filled with compressed air, wherein the rolling bellows is surrounded by a divided, sleeveshaped outer guide having a first outer guide part and a second outer guide part. The outer guide is preferably interrupted in the circumferential direction.

An outer guide divided into more than two parts is preferably provided.

During the inward deflection or pivoting of an air spring according to the prior art, the rolling fold on the air spring piston is pressed against the air spring piston by a one-piece outer guide, as a result of which a disadvantageous force is exerted on said piston. The divided outer guide according to an aspect of the invention significantly reduces the pressure of the lower rolling fold of the rolling bellows relative to the air spring piston. During inward deflection, the two outer guide parts pivot at different angles to one another, as a result of which the lower rolling fold is pressed only slightly or not at all against the air spring piston. That is to say that the differing cardanic deflection of the two outer guide parts ensures significantly improved transverse stiffness of the air spring unit.

According to a preferred embodiment, the rolling bellows forms a torsion fold between the first and the second outer guide part. Thus, in the central region of the air spring, a torsion point is created which allows advantageous absorption of torsion during the rotation of the air spring about the longitudinal axis thereof. At the same time, the torsion fold acts as a cardanic bearing and leads to positive transverse force compensation. By virtue of the internal pressure in the working chamber, the torsion fold is formed outward.

The torsion fold is preferably formed with an axial bellows. By virtue of the pliable axial bellows, the torsion fold has a more advantageous capacity to absorb torsion. The axial bellows is likewise also advantageous for cardanic deflection. The torsion fold can preferably be constricted by means of a ring to form a fold system which improves cardanic deflection.

Here, the ring can be arranged on the outside of the bellows or can be vulcanized into the bellows.

According to an alternative embodiment, the rolling bellows is designed as an extended hybrid bellows having a cross ply bellows in the region of the first and the second outer guide part, wherein the rolling bellows is designed as an axial bellows in the region of the torsion fold. Constructing the rolling bellows with a cross ply bellows in the lower and the upper region leads to a robust rolling bellows which nevertheless has a pliable torsion fold and brings with it the positive properties thereof.

According to an alternative preferred embodiment, the rolling bellows is designed as a hybrid bellows having a cross ply bellows in the region of the first outer guide part and having an axial bellows in the region of the second outer guide part. The hybrid bellows combines the advantages of both possible embodiments of the embedded reinforcements in order to provide a very comfortable and robust air spring.

According to another preferred embodiment, the first outer guide part can be secured on the rolling bellows by means of a first inner locking ring and/or the second outer guide part can be secured thereon by means of a second inner locking ring.

According to another preferred embodiment, it is also possible for the first outer guide part and/or the second outer guide part to be adhesively bonded to the rolling bellows.

According to another preferred embodiment, the first outer guide part is provided on the air spring piston in a region of a first rolling fold of the rolling bellows. Since the lower outer guide part is separate from the upper outer guide part, the lower outer guide part does not participate in the full pivoting motion during inward deflection. The lower outer guide part moves mutually parallel to the air spring piston.

According to another preferred embodiment, the second outer guide part is provided on the air spring cover in a region of a second rolling fold. In the embodiment of an air spring with two rolling folds, the upper outer guide part makes available a guide for the upper rolling fold.

In the embodiment of an air spring without the upper rolling fold, it is possible, according to a preferred embodiment, for the second outer guide part to jointly surround a part of the air spring cover and a part of the rolling bellows.

In an alternative embodiment, the second outer guide part is arranged between a clamping area of the rolling bellows on the air spring cover and the first outer guide part.

According to another preferred embodiment, the air spring unit comprises an integrated shock damper, wherein the second outer guide part remains aligned substantially parallel to the shock damper during the inward deflection of the air spring unit. During inward deflection, the two outer guide parts pivot at different angles to one another, as a result of which the lower rolling fold is pressed only slightly or not at all against the air spring piston, and therefore disadvantageous transverse forces no longer act on the shock damper.

The air spring unit is used in a chassis, preferably in an air spring system, for a motor vehicle.

BRIEF DESCRIPTION OF THE DRAWINGS

Further preferred embodiments of aspects of the invention will emerge from the subclaims and the following description of exemplary embodiments with reference to the figures.

In the figures.

DETAILED DESCRIPTION OF THE PREFERRED EMBODIMENTS

Figure 1:
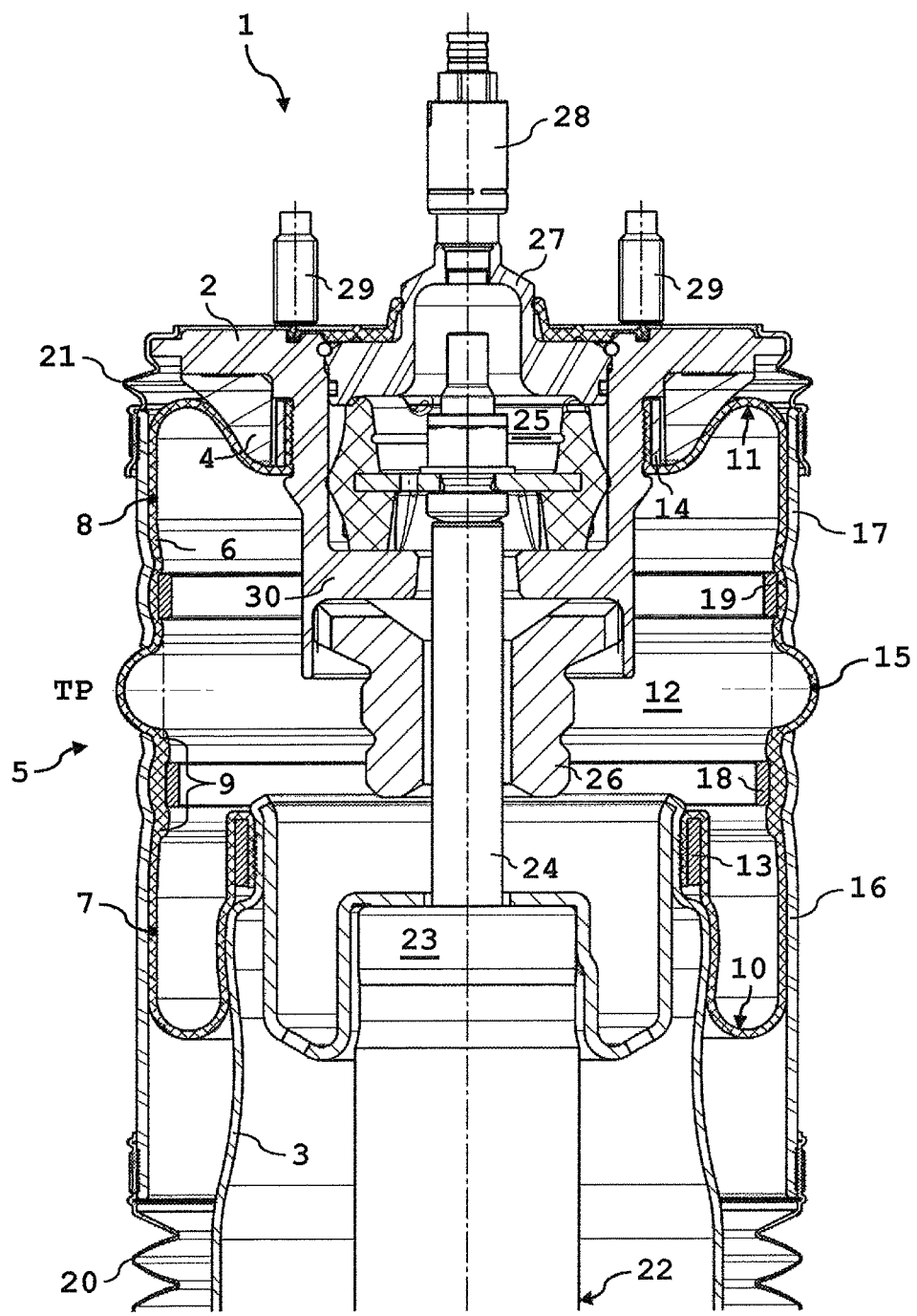
FIG. 1 shows a first exemplary air spring unit.

FIG. 1 shows a first exemplary air spring unit 1 having an air spring 5 and an integrated shock damper 22. On the one hand, air spring unit 1 can be secured on a motor vehicle body by means of an air spring cover 2 and, on the other hand, it can be secured on a wheel carrier of the motor vehicle chassis by means of shock damper 22, whereby the motor vehicle is sprung and damped.

Air spring 5 comprises a rolling bellows 6 made of elastomer material, wherein rolling bellows 6, together with air spring cover 2 and an air spring piston 3, at least partially delimits an airtight working chamber 12 that can be filled with compressed air. At its axial lower end, rolling bellows 6 is airtightly connected to air spring piston 3 by means of a first clamping ring 13 and, at its axial upper end, is airtightly connected to air spring cover 2 by means of second clamping ring 14.

In the case of relative movements in the axial direction of the air spring unit 1 between the air spring cover 2 and the air spring piston 3, rolling bellows 6 rolls on the rolling contact surface of the concentric air spring piston 3, forming a first rolling fold 10. Rolling bellows 6 furthermore forms a second rolling fold 11 on the air spring cover 2, said fold rolling on an annular wedge 4 and acting as a cardanic bearing. By means of the shape of the annular wedge 4, various rolling contours for second rolling fold 11 can be achieved, influencing the spring behavior or even the effect as a cardanic bearing. In addition to acting as a cardanic bearing, second rolling fold 11 also serves partially to absorb torsion when the air spring 5 rotates.

According to the example, the outer guide is embodied as a separate two-part outer guide having a first, lower outer guide part 16 and a second, upper outer guide part 17. An outer guide segmented into more than two parts is likewise conceivable. First outer guide part 16 surrounds first rolling fold 10 and is arranged in the region of the air spring piston 3, while second outer guide part 17 surrounds second rolling fold 11 and is arranged in the region of the air spring cover 2. First outer guide part 16 is secured on the rolling bellows 6 by means of a first inner locking ring 18 and second outer guide part 17 is secured thereon by means of a second inner locking ring 19. Both outer guide parts 16, 17 can also be adhesively bonded to the rolling bellows 6. Outer guide parts 16, 17 are preferably manufactured from aluminum or a steel, but can also be manufactured from a plastic.

At the same time, rolling bellows 6 is configured as a hybrid bellows according to the example. Thus, the first rolling fold 10 and a lower part of the rolling bellows 6 in the region of the first outer guide part 16 is embodied as a cross ply bellows 7, while second rolling fold 11 and an upper part of the rolling bellows 6 in the region of the second outer guide part 17 is embodied as an axial bellows 8. In the upper end region of the first outer guide part 16 or in the clamping region, by means of a first inner locking ring 18, there is a region of overlap 9 between cross ply bellows 12 and axial bellows 13 of the rolling bellows 6.

Rolling bellows 6 can also be designed as an extended hybrid bellows. In this case, first rolling fold 10 and a lower part of the rolling bellows 6 in the region of the first outer guide part 16 is embodied as a cross ply bellows 7, and second rolling fold 11 and an upper part of the rolling bellows 6 in the region of the second outer guide part 17 is likewise embodied as a cross ply bellows. Only torsion fold 15 is embodied as an axial bellows. Accordingly, the regions of overlap between the cross ply bellows and the axial bellows are provided in the clamping regions, by means of inner locking rings 18 and 19. Thus, a pliable axial bellows with effective torsion absorption and improved cardanic deflection is advantageously used for torsion point TP, wherein the remainder of the rolling bellows 6 is embodied as a robust cross ply bellows.

In the free region between the two outer guide parts 16, 17, rolling bellows 6 forms a torsion fold 15 according to the example, wherein torsion fold 15 is embodied as an axial bellows 8. Thus, an advantageous torsion point TP is created in the central region of the air spring 5, said torsion point enabling effective torsion absorption in the case of rotary movements of the air spring 5 by virtue of the embedded axial reinforcements.

Shock damper 22 is integrated into air spring piston 3, wherein air spring piston 3 surrounds a damper tube 23 of the shock damper in a hollow cylinder shape and is secured on said tube.

Shock damper 22 furthermore comprises a damper rod 24 and is supported centrally in a bearing socket 30 of the air spring cover 2 by means of damper bearings 25. An additional spring 26 resting against the air spring cover 2 is arranged below the damper bearing 25 and in the working chamber 12 of the air spring 5, wherein additional spring 26 surrounds the damper rod 24 in a hollow cylinder shape and serves as a stop buffer for damper tube 23. At an upper side of the air spring unit 1 are fastening elements 29. A closure cap 27 is disposed above the damper rod 24 and the damper bearing 25. An air connection 28 is disposed above the closure cap 27 and provides a means to connect the air spring unit 1 with an air supply (not shown).

Torsion fold 15 also advantageously acts as a cardanic bearing. As the air spring pivots, the lower rolling fold is pressed against the air spring piston as in the prior art, as a result of which a force is exerted on the shock damper. The divided outer guide according to the example significantly reduces the pressure of the first rolling fold 10 against air spring piston 3. During inward deflection, both outer guide parts 16, 17 pivot at different angles to one another, as a result of which first rolling fold 10 is pressed only slightly or not at all against air spring piston 3, and therefore disadvantageous transverse forces do not act on shock damper 22.

To protect the rolling folds against contamination, a corrugated bellows 20 is secured on the lower end of the first outer guide part 16, protecting the first rolling fold 10. A further protective bellows 21 is secured on the air spring cover 2 and on the upper end of the second outer guide part 17 and thus protects the second rolling fold 11.

Figure 2:
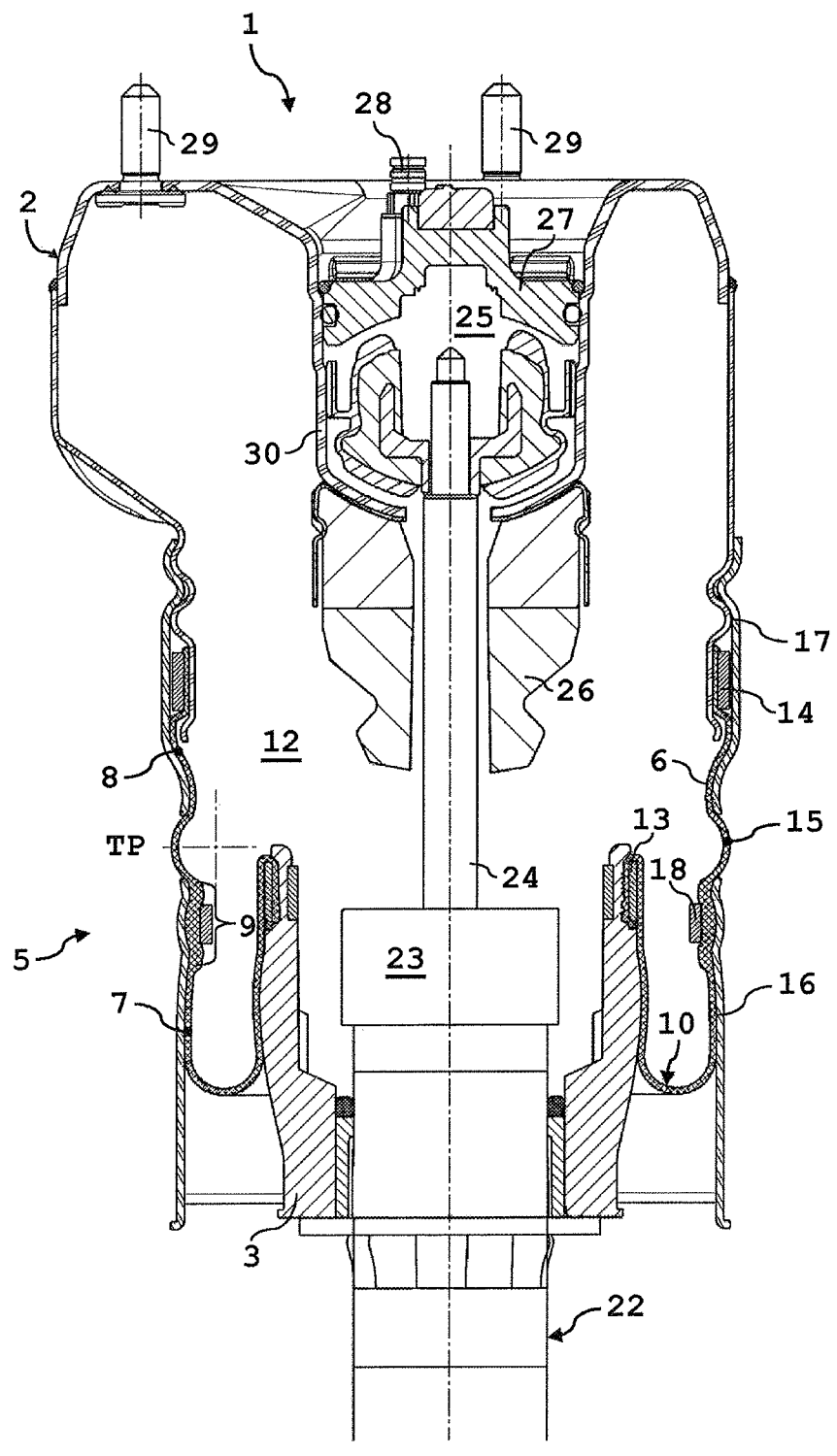
FIG. 2 shows a second exemplary air spring unit.

FIG. 2 shows a second exemplary air spring unit 1, which substantially corresponds in respect of the divided outer guide to the air spring unit in FIG. 1 and differs in the embodiment of the air spring cover 2.

Air spring cover 2 is shaped as a large-volume cover and can comprise several parts. In this exemplary embodiment, rolling bellows 6 is secured on air spring cover 2 by means of second clamping ring 14, without the formation of an upper rolling fold. Rolling bellows 6 rolls on the air spring piston 3 by means of rolling fold 10. First outer guide part 16 surrounds rolling fold 10 and is arranged in the region of the air spring piston 3, while second outer guide part 16 is provided radially around the clamping area 14 and surrounds an upper part of the rolling bellows as well as a lower part of the air spring cover 2. That is to say that the second outer guide part rests externally on the air spring cover 2, on the one hand, and on the rolling bellows 6, on the other hand. In this fastening variant, there is no inner locking ring.

As in the illustrative embodiment shown in FIG. 1, the torsion fold 15 with torsion point TP, which additionally acts as a cardanic bearing, forms between the two outer guide parts 16, 17. At the same time, as in FIG. 1, rolling bellows 6 is designed as a hybrid bellows or, alternatively, can be designed as an extended hybrid bellows.

Figure 3:
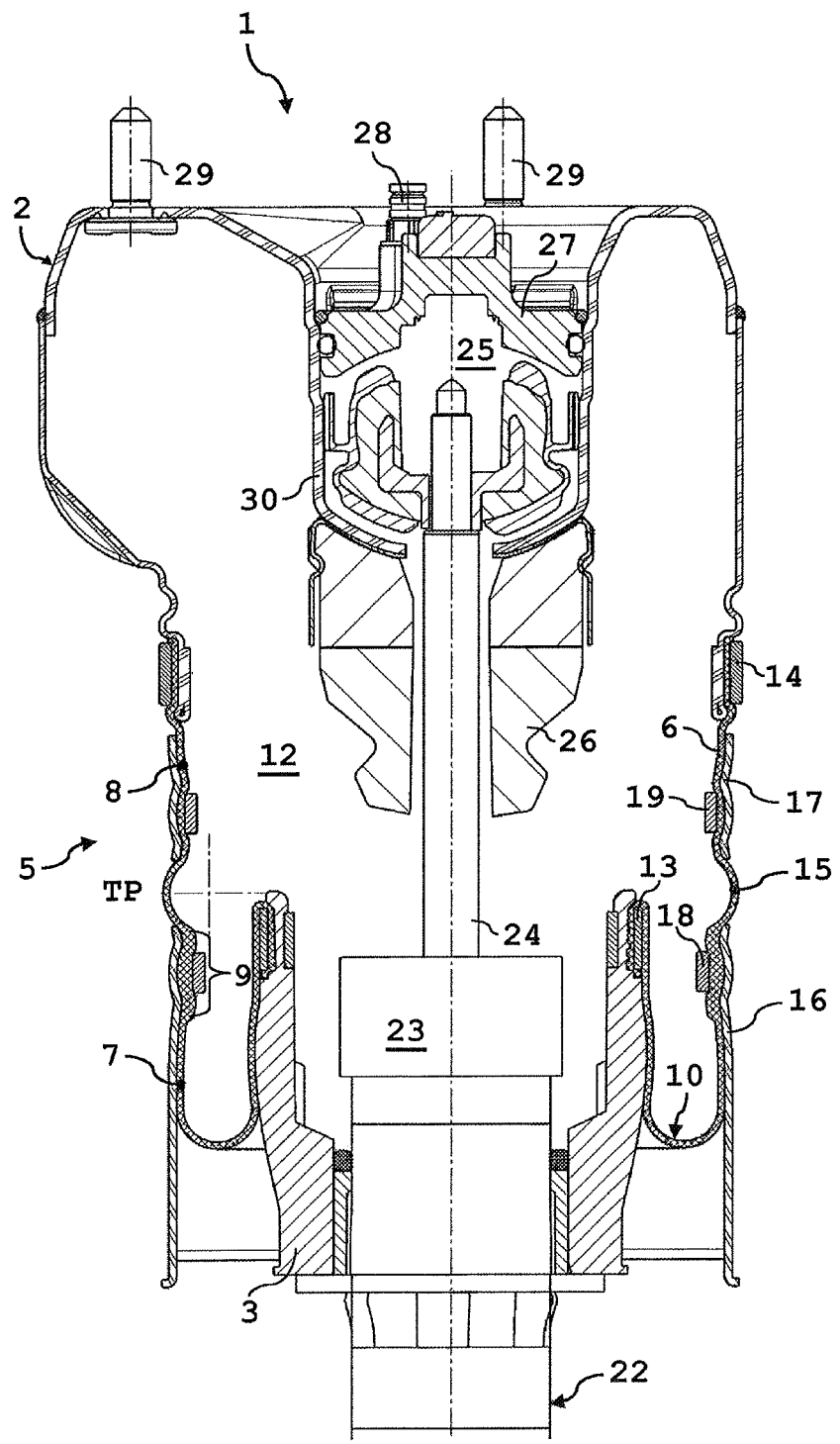
FIG. 3 shows a third exemplary air spring unit.

A third exemplary air spring unit 1 is shown in FIG. 3, differing in respect of the design of the second outer guide part 17 from the air spring unit in FIG. 2. In this fastening variant, second outer guide part 17 is secured by means of second inner locking ring 19 and is provided below the clamping area 14.

LIST OF REFERENCE SIGNS

1 Air spring unit
2 Air spring cover
3 Air spring piston
4 Annular wedge
5 Air spring
6 Rolling bellows
7 Cross ply bellows
8 Axial bellows
9 Region of overlap
10 First rolling fold
11 Second rolling fold
12 Working chamber
13 First clamping ring
14 Second clamping ring
15 Torsion fold
16 First outer guide part
17 Second outer guide part
18 First inner locking ring
19 Second inner locking ring
20 Corrugated bellows
21 Protective bellows
22 Shock damper
23 Damper tube
24 Damper rod
25 Damper bearing 26 Additional spring
27 Closure cap
28 Air connection
29 Fastening element
30 Bearing socket
TP Torsion point

The invention claimed is:

1. An air spring unit comprising:
   an air spring cover
   an air spring piston, and
   wherein an airtightly secured rolling bellows made of elastomer material partially delimiting a working chamber between the air spring cover and the air spring piston, which working chamber can be filled with compressed air,
   wherein the rolling bellows is surrounded by a divided, sleeve-shaped outer guide having a first outer guide part and a second outer guide part, the first outer guide part separate from the second outer guide part by a space, and
   wherein the rolling bellows forms a torsion fold in the space between the first and the second outer guide part.

2. The air spring unit as claimed in claim 1, wherein the rolling bellows is designed as an axial bellows in the region of the torsion fold.

3. The air spring unit as claimed in claim 1, wherein the rolling bellows is designed as a hybrid bellows having a cross ply bellows in the region of the first outer guide part and having an axial bellows in the region of the second outer guide part.

4. The air spring unit as claimed in claim 1, wherein the first outer guide part can be secured on the rolling bellows by a first inner locking ring and/or the second outer guide part can be secured thereon by a second inner locking ring.

5. The air spring unit as claimed in claim 1, wherein the first outer guide part and/or the second outer guide part are adhesively bonded to the rolling bellows.

6. The air spring unit as claimed in claim 1, wherein the first outer guide part is provided on the air spring piston in a region of a first rolling fold of the rolling bellows.

7. The air spring unit as claimed in claim 1, wherein the second outer guide part is provided on the air spring cover in a region of a second rolling fold of the rolling bellows.

8. The air spring unit as claimed in claim 1, wherein the second outer guide part jointly surrounds a part of the air spring cover and a part of the rolling bellows.

9. The air spring unit as claimed in claim 1, wherein the rolling bellows is secured on the air spring cover by a clamping area, wherein the second outer guide part is arranged between the clamping area and the first outer guide part.

10. The air spring unit as claimed in claim 1, wherein the air spring unit comprises an integrated shock damper, wherein the second outer guide part remains aligned substantially parallel to the shock damper during the inward deflection of the air spring unit.

11. A chassis for a motor vehicle, comprising an air spring system, the air spring system comprising the air spring unit as claimed in claim 1.

12. An air spring unit comprising:
    an air spring cover
    an air spring piston, and
    wherein an airtightly secured rolling bellows made of elastomer material partially delimiting a working chamber between the air spring cover and the air spring piston, which working chamber can be filled with compressed air,
    wherein the rolling bellows is surrounded by a divided, sleeve-shaped outer guide having a first outer guide part and a second outer guide part,
    wherein the rolling bellows forms a torsion fold between the first and the second outer guide part,
    wherein the rolling bellows is designed as an axial bellows in the region of the torsion fold, and
    wherein the rolling bellows is designed as an extended hybrid bellows having a cross ply bellows in the region of the first and the second outer guide part, wherein the rolling bellows is designed as an axial bellows in the region of the torsion fold.

* * * * *